United States Patent [19]

Bowerman

[11] 4,206,817
[45] Jun. 10, 1980

[54] SCRAPER BLADE MECHANISM FOR DOUBLE DISC

[76] Inventor: Galen Bowerman, Dawson, N. Dak. 58428

[21] Appl. No.: 942,933

[22] Filed: Sep. 18, 1978

[51] Int. Cl.² .................... A01B 15/16; A01B 23/06
[52] U.S. Cl. .......................... 172/559; 111/88; 172/560; 172/566
[58] Field of Search ............... 172/167, 168, 558–566; 111/88

[56] References Cited

U.S. PATENT DOCUMENTS

| 114,002 | 4/1871 | Godfrey | 172/559 X |
| 523,508 | 7/1894 | Bauer et al. | 172/559 |
| 660,759 | 10/1900 | Morphy | 172/560 |
| 734,017 | 7/1903 | Van Brunt | 172/560 |
| 785,865 | 3/1905 | Davis | 172/560 X |
| 808,021 | 12/1905 | Davis | 172/561 X |
| 1,264,970 | 5/1918 | Pfeifer | 172/560 |
| 4,009,668 | 3/1977 | Brass et al. | 111/88 X |
| 4,034,688 | 7/1977 | Ernst | 172/566 X |

FOREIGN PATENT DOCUMENTS 471697  2/1951  Canada ...................................... 172/559

*Primary Examiner*—Edgar S. Burr
*Assistant Examiner*—Steven A. Bratlie
*Attorney, Agent, or Firm*—Norman P. Friederichs

[57] ABSTRACT

Seed sowing equipment is disclosed including a pair of cooperating disc blades mounted for rotation on an axle. A scraper is provided for cooperation with each of such blades for preventing the accumulation of soil on the inward side of such disc blades. The scraper includes a ring portion and a plurality of radially inwardly extending spokes terminating in a hub portion.

7 Claims, 7 Drawing Figures

U.S. Patent  Jun. 10, 1980  4,206,817
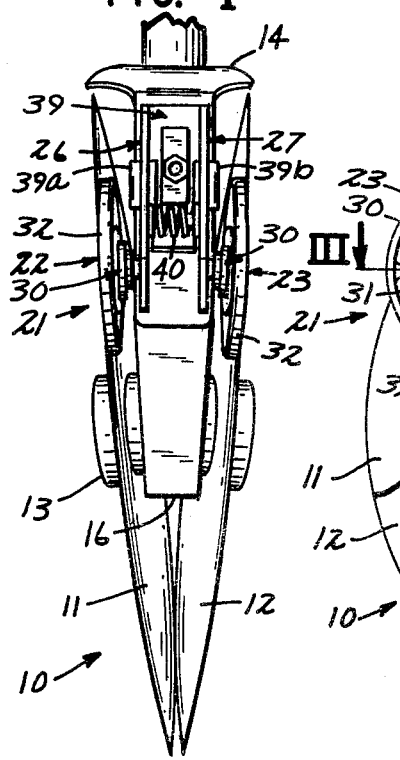
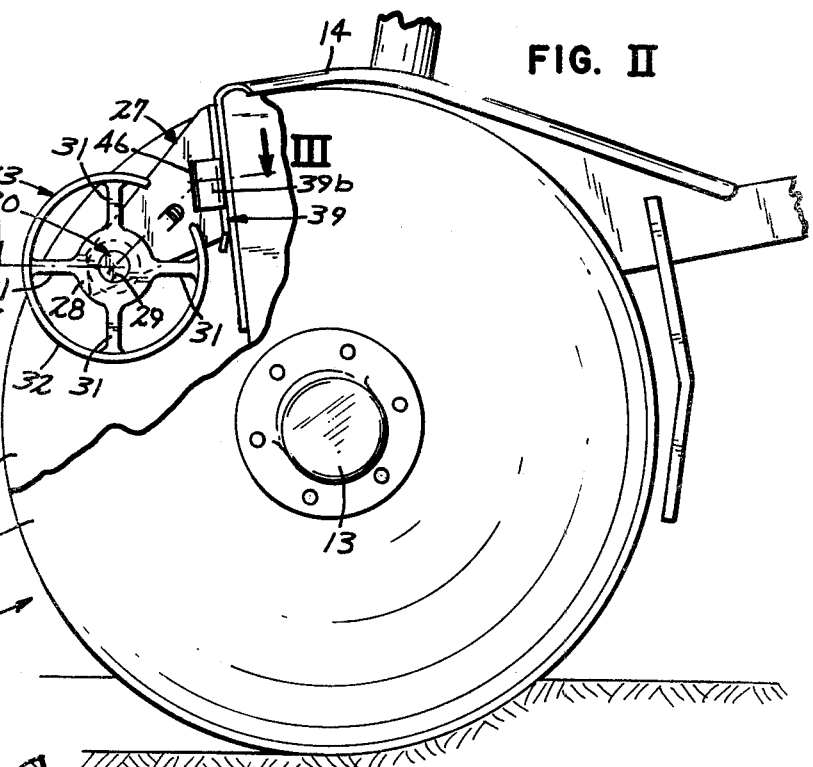
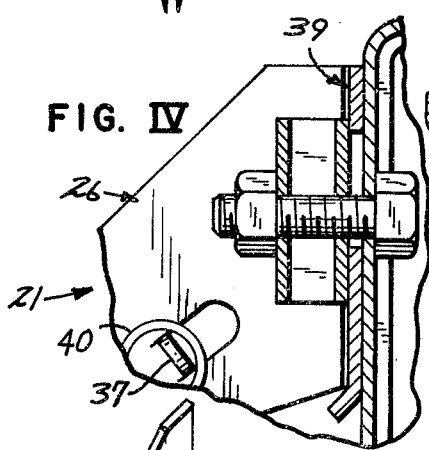
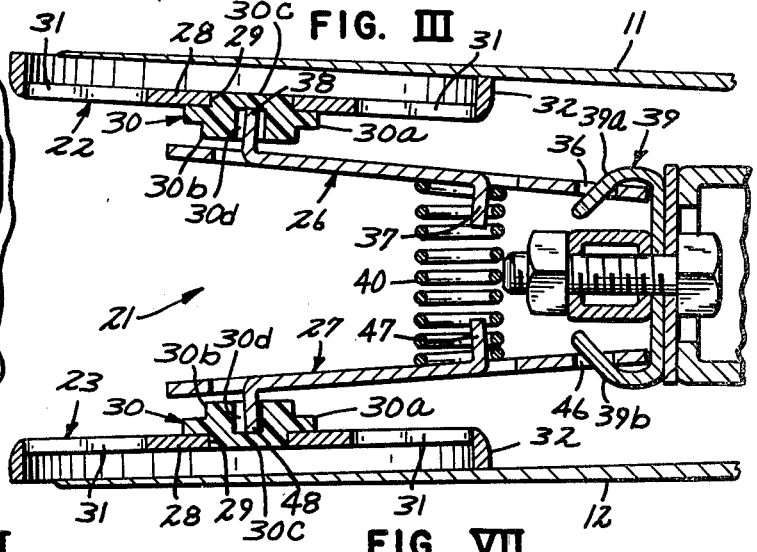
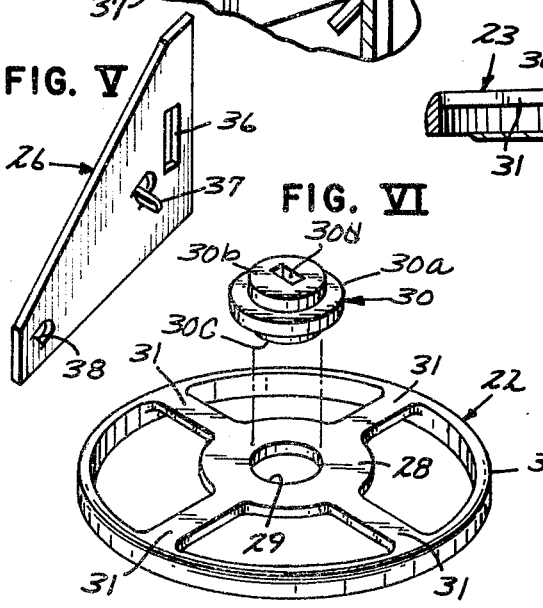
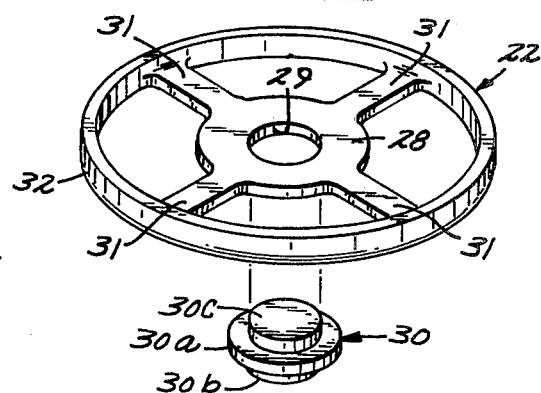

SCRAPER BLADE MECHANISM FOR DOUBLE DISC

BACKGROUND OF THE INVENTION

The present invention relates to agricultural equipment and more particularly to agricultural equipment for the sowing of grain such as wheat.

The sowing of grain is a very old art and the equipment likewise goes back many years. Perhaps, the first agricultural implement for sowing of seed was merely a stick or branch with which the farmer opened a shallow trough in the soil, where seeds were deposited, covered and later grown into a food crop. Such methods were slow and farming was limited to a small scale. Agricultural technology today is an advance art. The agricultural equipment available today overcomes many of the difficulties and problems encountered by the farmer in yesteryear. Modern sowing equipment satisfactorily serves its purpose particularly if soil conditions are at an optimum. If soil conditions are not good, however, many age old problems still persist. A problem which is common to many farm implements which penetrate the soil is the accumulation of soil on the penetrating portion. Such problems are common to plows, cultivators and the like. Similar problems occur with any disc type farm implement.

Various attempts have been made to solve such soil accumulation problems particularly with regard to disc type implements. In some instances, a knife blade has been disposed adjacent the disc blade. The knife blade serves to scrape accumulated soil from the disc blade. Such knife blades, however, have not been completely satisfactory in that they wear and either become ineffective or they must be adjusted in accordance with the amount of wear that has taken place. An alternative approach has been to utilize a saucer-shaped scraper which may be urged toward the disc blade, for example, utilizing a spring. Although the spring mechanism automatically adjusts the scraper in accordance with the amount of wear that has taken place, this also has failed to serve as a complete solution to the problem. The difficulty encountered with such saucer type scrapers is that soil may continue to accumulate on the disc blade with the saucer merely riding over such accumulation. The present invention overcomes such problems and provides a highly satisfactory mechanism for scraping or removing soil from disc blades. The removal of accumulated soil from a disc blade is particularly important in the case of sowing equipment since any accumulation of soil on the disc blades may prevent proper depositing of seed in the trough cut by the cooperating disc blades.

GENERAL DESCRIPTION OF THE INVENTION

The present invention provides a disc blade-scraper arrangement which overcomes the problems encountered with the known scrapers. The present invention as applied to sowing equipment will normally include a pair of cooperating disc blades which serve to open a trough in which seeds may be deposited. The disc blades may be mounted for rotation on a common axle. The present scraper or scrapers will generally be located adjacent the inward face of each of the disc blades. The scraper will include a hub portion suitable for mounting on some type of stub shaft, a plurality of radially extending spokes and an outer cylindrical or ring-like portion. The scraper system will also include suitable mounting apparatus including a shaft on which the scraper may be rotatably mounted and a spring for urging the scraper toward the disc blade.

IN THE DRAWINGS

FIG. I shows an end view of one embodiment of the present invention;

FIG. II shows a side view of the present invention with portions broken away;

FIG. III is a sectional view taken along the lines III—III in FIG. II;

FIG. IV shows a scraper blade of the present invention;

FIG. V shows a support for the scraper blade;

FIG. VI is an exploded side view of a scraper; and

FIG. VII is an exploded view of the opposite side of the scraper blade.

DETAILED DESCRIPTION OF THE PRESENT INVENTION

The sower assembly 10 of the present invention, one embodiment of which is shown in FIGS. I-VII may include a pair of disc members 11 and 12 which are rotatably supported on an axle assembly 13. The axle assembly is in turn supported on the implement arm 14. Since the implement arm and remainder of the sowing implement may be of a conventional nature, it will not be described herein in detail except to note that the implement may include a plurality of hoppers for storage of the seed and the implement arm 14 may include a duct for feeding the seed from such hoppers to the seed outlet 16 located between the disc blades 11 and 12.

The sowing apparatus 10 has a scraper assembly 21 including a pair of scraper blades 22 and 23 and mechanism 26, 27 for urging the scraper blades 22 and 23 into planar engagement with the adjacent disc 11 and 12. The scraper blades 22 and 23 may be identical and therefore only blade 22 (FIGS. IV-VII) will be described herein. The scraper blade 22 has a central hub portion 28 with an opening 29 in the center thereof for mounting on a stub axle as hereinafter described. The scraper blade 22 has a plurality of radially extending spokes 31 which are integral at one end with the hub 28 and attached at the other end to a ring or cylinder portion 32.

A bearing member 30 is provided for mounting between a stub shaft and the blade 22. The bearing member 30 may be molded of a suitable resin or plastic and may include a center portion 30a of enlarged diameter, with portions 30b and 30c on either side thereof. Portion 30b has an opening 30d for a reception of a stub shaft. Portion 30c is of suitable size for rotatable reception in opening 29 of blade 22.

The scraper support mechanisms 26 and 27 cooperate to hold the scraper blades 22 and 23 in engagement with the discs 11 and 12. The support mechanism 26 may be fabricated of plate metal and includes a slot like opening 36, a tab or stub shaft 37 extending sidewardly in one direction and a tab or stub shaft 38 extending in the other direction. The support mechanisms 26 and 27, when in use, are attached to a hanger 39 which is integral with the arm 14. In other words, the flange 39a of hanger 39 extends through the slot-like opening 36 in plate 26. The flange 39b of hanger 39 extends through a similar opening 46 in support 27. A spring 40 is under compression and urges the supports 26 and 27 apart, thus toward disc members 11 and 12. The spring 40 may be maintained in proper alignment by engagement over the projection 37 of support 26 and the projection 47 of support 27. As shown in FIG. III, the projections 37 and 47 extend inwardly. The stub axle 38 of the support 26 extends into the opening 30d in bearing 30. The bearing 30 may be rotatably locked with respect to stub axle 38. In similar manner, the projection or stub shaft 48 of support 27 engages scraper blade 23.

OPERATION OF THE INVENTION

Although the operation of the present invention is apparent from the preceding description, it will be further detailed hereinafter in order to even more thoroughly describe the present invention. In normal operation, the spring 40 urges the supports 26 and 27 outwardly such that the stub shafts 38 and 48 rotatably support scraper blades 22 and 23 respectively. The supports 26 and 27 thus urge the scraper blades 22 and 23 into planar contact with discs 11 and 12 respectively. Thus, the ring portion 32 of scraper blade 22 is in scraping contact with disc 11. In similar manner, scraper blade 23 cleans disc 12. It is to be noted that compacted soil does not accumulate beneath the scraper blades such as 22 but rather is expelled through the open area between the spokes 31. The scraper blades 22 and 23 do wear. However, such wear is substantially uniform and the spring 40 maintains the scraper blades 22 and 23 in intimate contact with the discs 11 and 12. Over a period of time, the scraper blades 22 and 23 may wear to such an extent that replacement is necessitated. In this case, one merely forces the supports 26 and 27 toward one another, thus compressing the spring 40, until the stub shafts 38 and 48 are removed from the respective hubs of scrapers 22 and 23. New scraper blades may then be mounted in place.

It is to be recognized that various modifications may be made to the scraper assembly 21 without departing from the broader scope of this invention. For example, the stub shaft may be a portion of the scraper hub and extend into a suitable opening in the support. Also, the scraper blade may have a larger number or a smaller number of radiating spokes. However, it is to be noted that the scraper blade must be provided with spokes as well as a significant open area between adjacent spokes.

What is claimed is:

1. A seed sowing device comprising a pair of cooperating disc blades and axle means for rotatably supporting such disc blades, each of said disc blades having an inwardly facing side; and scraper mechanism comprising a pair of scraper blades and means for supporting said scraper blades with respect to said disc blades, each of said scraper blades comprising a hub portion, a ring-like portion and a plurality of radially extending spokes, said spokes interconnecting said hub portion and said ring-like portion, the ring-like portion of each one of such scraper blades being held in planar contact with the respective inwardly facing side of the adjacent disc blade, said scraper blade support means including spring means for releasably urging said scraper blades toward said disc blades.

2. The sowing device of claim 1 wherein said scraper blade support means comprise a pair of plate structures, one such plate structure being associated with each of said scraper blades.

3. The sowing device of claim 2 wherein said device includes hanger means and wherein said plate structures are each pivotally attached adjacent one end to said hanger means, said plate structures each including a stub shaft portion adjacent the other end of said plate for engagement with the hub of the respective of said scraper blades.

4. The sowing device of claim 3 wherein said spring means is disposed between said plate structures intermediate said one end and said other end of said plate structures.

5. The sowing device of claim 4 wherein said plate structures each include an inwardly extending projection and wherein said spring means is held in place by said projections.

6. The sowing device of claim 3 wherein said sowing device includes bearing means disposed between said stub shaft portion and said hub.

7. The sowing device of claim 6 wherein said bearing means is locked with respect to said stub shaft portion and wherein each of said scraper blades are rotatably mounted on said bearing means.

* * * * *